Aug. 3, 1943.    E. F. STOVER    2,325,714
FLOW METER
Filed Nov. 1, 1941    2 Sheets-Sheet 1

Inventor·
Emory Frank Stover
By F. DeWitt Goodwin
Attorney

Aug. 3, 1943. E. F. STOVER 2,325,714
FLOW METER
Filed Nov. 1, 1941 2 Sheets-Sheet 2
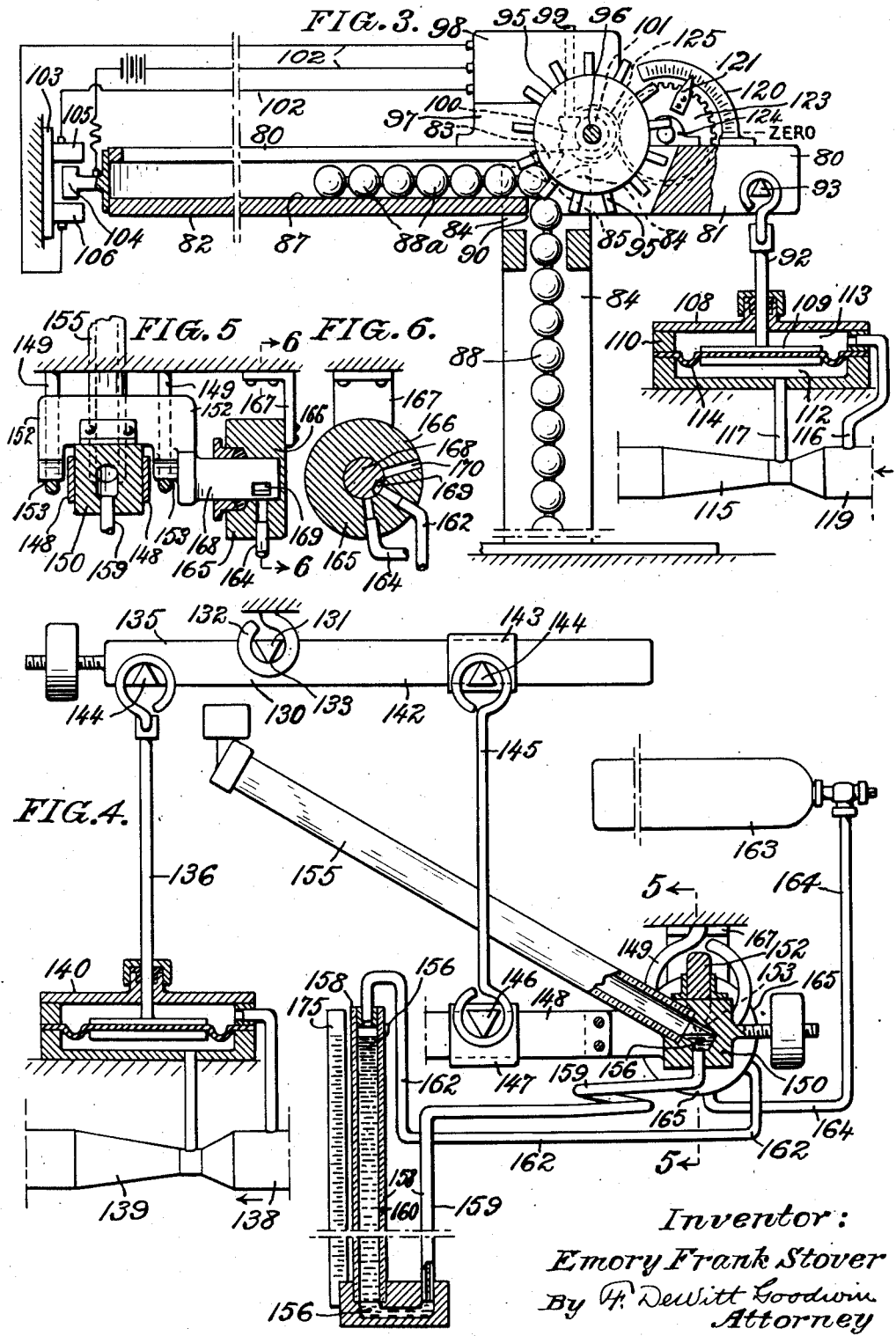
Inventor:
Emory Frank Stover
By F. DeWitt Goodwin
Attorney Patented Aug. 3, 1943

2,325,714

UNITED STATES PATENT OFFICE 2,325,714

FLOWMETER

Emory Frank Stover, Wynnewood, Pa.

Application November 1, 1941, Serial No. 417,487

13 Claims. (Cl. 73—205)

My invention relates to improvements in fluid meters and particularly to meters used in connection with Venturi tubes, orifices, flow nozzles, Pitot tubes, and other primary metering devices, in which the rate of flow through a conduit is proportional to the square root of the differential pressure applied to a pressure responsive device by one of the primary devices, and the meter is adapted for obtaining the rate of flow through the conduit and indicating the rate of flow on a scale of uniform divisions.

The object of my invention is to provide a flow meter embodying a novel lever system, having first and second arms loaded with concentrated and uniform loadings, respectively, and adapted for producing a reading directly proportional to the rate of flow.

A further object is to arrange the lever arms so that the first one of the arms may be loaded with a loading having a fixed lever arm about a pivot axis, thus forming a concentrated load which is adapted to be varied as the differential pressure, which latter is proportional to the square of the rate of flow, and provide means for loading the second arm as a cantilever beam, with a uniform load applied at the pivot axis of the second arm and extended toward the free end of the latter until the moment of the uniform load about said axis balances the moment of the concentrated load upon the first arm. When the arms are in balance the moment of the uniform load upon the second arm is proportional to the square of the length of the uniform load upon the second arm, and the length of the uniform load represents the square root of the differential pressure, and therefore said length is a lineal measurement of the rate of flow through the conduit.

A further object is to provide means for indicating the length of the uniform load which is a direct measurement of the rate of fluid flow through the conduit.

A further object is to provide a lever system adapted for having a uniform load applied to the second lever arm, which load may be in the form of a liquid such as mercury, or a continuous series of weights, such as a chain.

A further object is to arrange actuating means for moving the uniform load upon the second arm to establish equilibrium of the lever system, which actuating means is adapted to be operated by either pneumatic power, or electrical power, and controlled by the unbalancing of the lever system.

A further object is to provide a construction of the lever system employing lever arms mounted upon separate axes and connected by a link which is adjustable relatively to said axes, and adapted for making various adjustments enabling the meter to be used without other alterations for a wide variety of maximum differential pressures.

These together with various other novel features of construction and arrangements of the parts, which will be hereinafter more fully described and claimed, constitute my invention.

Referring to the accompanying drawings:

Fig. 3 is a vertical sectional view of a modified form of my invention adapted for employing weights for applying a uniform load upon the second lever arm.

Fig. 4 is a vertical sectional view of a lever system having lever arms mounted upon separate axes and connected by a compensating link which is adjustably mounted upon said arms, and showing pneumatic means for moving the uniform load upon the second arm.

Fig. 5 is a transverse vertical section on line 5—5 Fig. 4.

Fig. 6 is a vertical section on line 6—6 Fig. 5.

Figure 1:
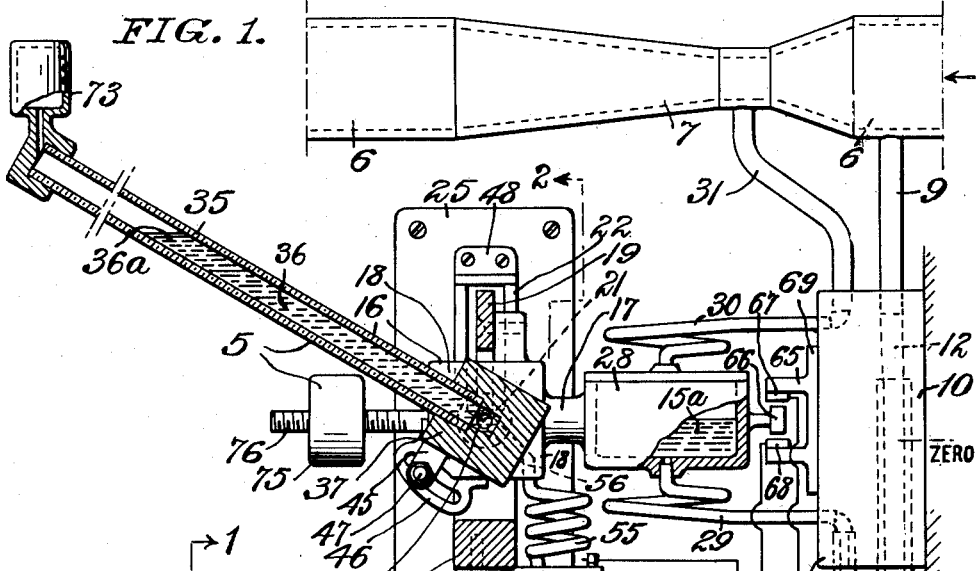
Fig. 1 is a vertical section as on line 1—1 Fig. 2, showing a preferred form of my invention.

In the drawings, in which like reference characters refer to like parts, 5 represents my novel meter shown connected with a conduit 6 through which fluid is adapted to flow in the direction of the arrow. A primary metering device in the form of a Venturi tube 7 is connected with the conduit 6 and is adapted for producing a differential pressure proportional to the square of the rate of fluid flow through the conduit 6.

The differential pressure responsive device shown in Fig. 1, is in the form of a manometer 8, which is connected by means of a pipe 9 with the high pressure side of the primary device 7. The pipe 9 is connected with a header 10, having a passage 12, communicating with the pipe 13, forming one leg of the U-tube, or manometer 8. The tubes 13 and 14 of the manometer contain mercury 15, which is subjected to the differential pressure for moving the mercury for purposes hereinafter described.

Figure 2:
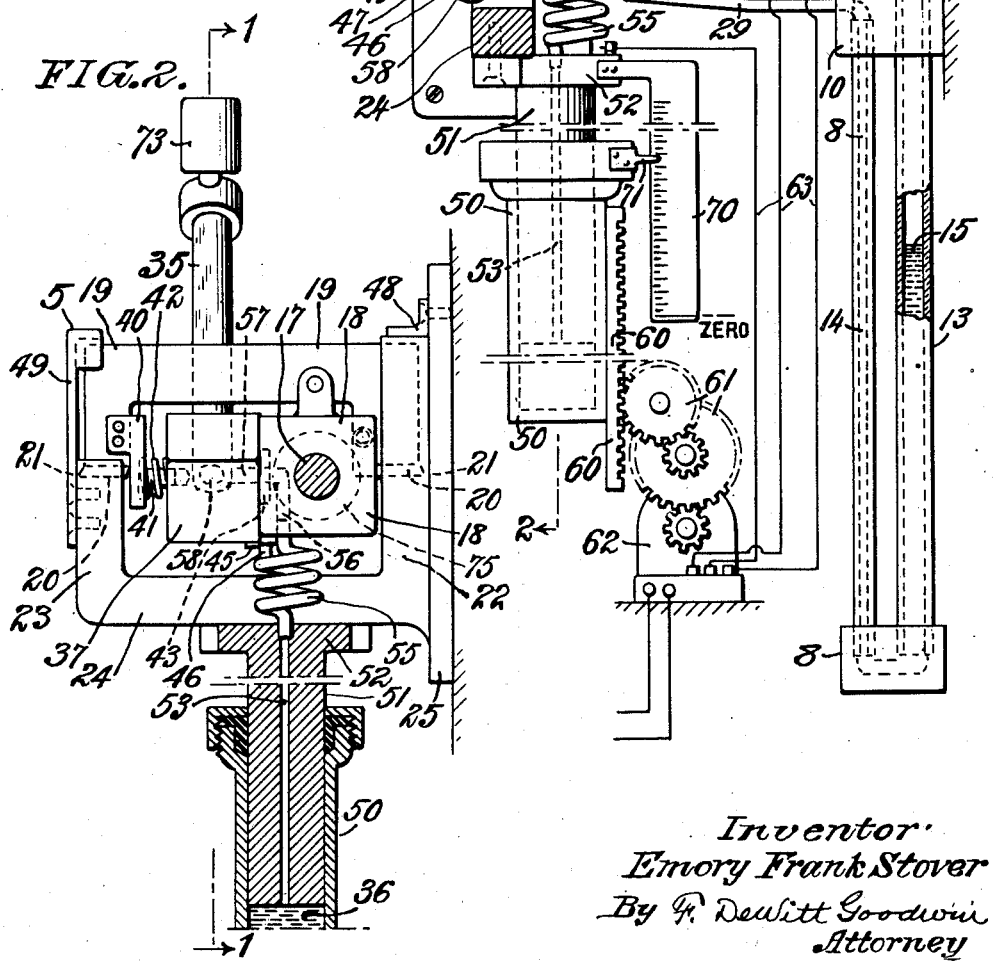
Fig. 2 is a transverse vertical section on line 2—2 Fig. 1.

The meter, as shown in Figs. 1 and 2, embodies a lever system 16, which includes a first lever arm 17 having an enlarged head, or block 18, secured to a bridge plate 19, having knife edges 20, forming a pivot axis 21. The knife edges 90 are pivotally supported upon fixed bearings 22 and 23, formed upon a bracket 24, having a base plate 25 adapted to be mounted upon a fixed support.

The lever arm 17 is provided with a receptacle 28 adapted for receiving a load having a constant moment arm about the axis 21. Said load, in the form shown in Fig. 1, consists of mercury 15a, adapted to be forced into the receptacle 28 through a flexible pipe 29, connected with the header 10, and communicating with the leg 14 of the U-tube or manometer 8. The receptacle 28 is also connected by a flexible pipe 30 with the header 10 and is in communication, through a pipe 31, with the low pressure side of the Venturi tube 7. When there is flow of fluid through the conduit 6 a differential pressure is created with forces the mercury from the manometer 8 into the receptacle 28 and unbalances the lever system.

A second lever arm 35 is included in the lever system, which arm is in the form of a tube adapted for containing mercury 36, for loading the arm 35 as a cantilever beam with a uniform loading.

The arm 35 is mounted for pivotal movement about the same axis 21 as the first arm 17, and said arm 35 is movable with the arm 17 about said axis 21. The arm 35 is secured at its end adjacent to the axis 21, in a head or block 37, which latter is secured for axial adjustment, relatively to the block 18, and also to the bridge plate 19, to which the arm 17 is secured, as shown in Fig. 2.

The arm 35 is adjustably mounted relatively to the arm 17, as shown in Fig. 2, by means of a bracket 40 secured to the bridge plate 19. The bracket 40 has a stud shaft 41 which occupies an axial recess formed in the block 37. A spring 42 encircles the shaft 41 and tends to press the end faces of the blocks 18 and 37 together, thereby holding an annular projection 43, formed upon one of the blocks in an annular recess formed in the opposite block, as shown in dotted lines in Fig. 2.

The blocks 18 and 37 are secured in alignment upon the axis 21 by radially projecting face plates 45 and 46, which are secured upon the respective blocks and are adapted to be secured together by a bolt 47 for rigidly locking the arm 35 in an adjusted position relatively to the arm 17. By this means the radial position of the arm 35, about the axis 21, may be adjusted to compensate for variations in the size of the bore of the tubular arm 35, which latter is preferably formed of glass. Said means also permits the adjustment of the meter for different maximum values of differential pressure without changing the length of a scale provided for measuring the length of the uniform load upon the arm 35. Said adjusting means also permits the arm 35 to be readily detached from the arm 17.

The bridge plate 19 is retained upon the bearings 22 and 23 by retaining plates 48 and 49, detachably secured to said bearings. By removing the plates 48 and 49 the arms 17 and 35 may be readily removed from the bearings 22 and 23.

The lever arm 35 is adapted to be supplied with the mercury 36 from the cylinder 50, which latter is slidably mounted upon a plunger 51, secured in a fixed position. Upon the plunger 51 is a head 52 which is secured upon a bracket 24. The plunger 51 is provided with a longitudinal passage 53, to which is connected a flexible pipe 55 which is also connected with the block 18 of the arm 17. Said block 18 has a passage 56 which communicates with an axial passage 57, formed in the block 37, of the arm 35. Said passage 57 communicates with a chamber 58, formed in the block 37 and located at the open end of the tubular arm 35. This construction forms a means for applying a uniform load upon the arm 35, with the load having a length extending from the pivot axis 21 toward the free end of said arm.

The lever arm 35 is inclined from a horizontal position, as shown in Fig. 1, so that the liquid 36 will flow from the arm 35 and reduce, or entirely remove, the load from the arm 35, when the cylinder 50 is extended relatively to the plunger 51.

The cylinder 50 has secured thereon a rack 60, which is engaged by suitable gearing 61, adapted to be rotated in opposite directions by a reversing motor 62, included in an electric circuit 63, and controlled by the switch 65.

The switch 65 has a movable contact plate 66 secured upon the lever arm 17, and fixed contact plates 67 and 68 secured upon a base plate 69.

A scale 70, having uniform graduations thereon, is secured upon the fixed head 52 of the plunger 51, and a pointer 71 is secured upon the movable cylinder 50. The graduations upon the scale 70 correspond to the rate of fluid flow through the conduit 6, and the position of the pointer relatively to the scale will directly indicate the rate of fluid flow through the conduit.

Upon the free end of the arm 35 is an air container 73 adapted for sealing the arm 35 for preventing air from coming into contact with the mercury and oxidizing the same. Said container has sufficient capacity to allow the air to expand and contract. The container 73 also provides means for preventing the loss of mercury in the event the meter is inverted.

A manually adjustable weight 75 is in threaded engagement with a rod 76 secured to the block 18. The weight 75 provides means for balancing the lever system when the arms 17 and 35 are not loaded.

The operation of the meter shown in Fig. 1 is as follows: When there is fluid flowing through the conduit 6 a differential pressure will be produced which is proportional to the square of the rate of flow, and said pressure will force the mercury 15 from the pressure responsive device into the receptacle 28 and form a concentrated load 15a upon the first arm 17. The lever system is thus thrown out of balance, causing a movement of the lever arms which will close the circuit between the switch plates 66 and 68 and start the motor in a direction for moving the cylinder 50 and the piston 51, relatively to each other, thereby forcing the mercury 36 into the tubular arm 35 and forming a uniform load 36a upon the second lever arm 35, which latter load will have a moment sufficient to balance the moment of the load 15a upon the first lever arm 17. When the lever system is restored to a balanced position the motor will be stopped by the opening of the circuit between the switch plates 66 and 68.

A reduction in the rate of flow will reduce the differential pressure and allow the mercury 15a to flow from the receptacle 28 to the responsive device 8 and reduce the load 15a on the arm 17, causing the latter to move and engage the switch plates 66 and 67 for rotating the motor in the reverse direction for extending the cylinder 50 relatively to the plunger 51, thereby allowing the mercury 36a to flow from the arm 35 until the system is again balanced and the motor stopped by the opening of said switch plates; thus the lever system will tend to maintain the lever arms in balance at any rate of flow through the conduit. The relative positions of the scale 70 and the pointer 71 will indicate the rate of flow of fluid through the conduit 6.

Fig. 3 illustrates a form of my invention which employs means for loading the second arm of the lever system with weights in the form of a chain adapted to form a uniform load.

A beam 80, forming lever arms 81 and 82, is provided with transversely projecting stud shafts 83, shown in dotted lines, said shafts 83 have knife edges which are mounted upon bearings 84 and form a pivot axis 85 for the beam 80.

The arm 81 is adapted to receive a concentrated load which varies as the square of the rate of flow of fluid through a conduit. The second arm 82 of the beam is constructed with a track 87 adapted for guiding a chain 88 throughout the length of the arm 82 to form a uniform load having a length extending from the pivot axis 85 toward the free end of the arm 82.

The beam 80 is provided with an aperture 90 located adjacent to the pivot axis 85, through which aperture the chain 88 may be moved from a suspended position directly in vertical alignment with said axis 85, to a horizontal position upon the track 87 of the arm 82, for maintaining the beam in balance against the concentrated load applied, through a rod 92 to the first arm 81, at the fixed point of attachment 93.

The chain 88 is movable relatively to the length of the arm 82 by means of a sprocket wheel 95, secured upon a shaft 96, mounted for rotation upon a bearing 97 which is secured to the beam 80. A reversing motor 98 is mounted upon the bearing 97, with the motor shaft 99 positioned vertically; a worm 100 is secured upon the shaft 99 and meshes with a worm wheel 101, secured upon said shaft 96, and adapted for rotating the sprocket wheel 95 having radially projecting pins adapted for engaging the chain 88.

The motor 98 is included in an electric circuit 102, which is controlled by a switch 103, having a movable contact plate 104, mounted on one end of the beam 80, and fixed contact plates 105 and 106, mounted upon the base of the switch 103.

The means for applying a concentrated load to the arm 81 may be in the form of a manometer 8, as shown in Fig. 1, or it may be in the form of a well known pressure responsive device 108. Said device 108 includes a plunger 109, movably mounted within a casing 110, forming a low pressure chamber 112 and a high pressure chamber 113. Said chambers are separated by a flexible diaphragm 114, having the plunger 109 secured thereto. The rod 92 is attached to the plunger 109.

A primary differential pressure producing device 115 has a pipe 116 which connects the high pressure side of said device 115 with the high pressure chamber 113 of the responsive device 108, and a pipe 117 which connects the low pressure side of said device 115 with the low pressure chamber 112 of the device 108, which latter is adapted for applying a concentrated load through the rod 92 to the first lever arm 81, which load varies as the square of the rate of flow of fluid through the conduit 119.

When there is flow through the conduit 119 a force will be applied through the rod 92 to the lever arm 81 which will move the beam 80 out of balance and engage the switch plates 104 and 105, and operate the motor 98 for rotating the sprocket wheel 95. The wheel 95 is thus rotated in a direction for extending the chain 88 upon the second lever arm 82 until a uniform load 88a is applied to the arm 82 which will restore the beam to its balanced position, thus disengaging the switch plates and stopping the motor. The beam 80 will remain in a balanced position until there is a change in the rate of flow through the conduit 119.

When there is a change in the rate of flow which causes the uniform load 88a, upon the arm 82, to exceed the concentrated load upon the first arm 81, the beam 80 will move and engage the switch plates 104 and 106 and operate the motor for reducing the length of the uniform load relatively to the arm 82 and restore the beam to its balanced position. By this arrangement the chain 88 will be adjusted to a length upon the arm 82 which will form a uniform load 88a, having a moment which will maintain the beam in balance against a concentrated load applied to the first arm 81 by the rod 92. When the beam is so balanced the length of the uniform load on the second arm 82 will be directly proportional to the rate of flow of fluid through the conduit 119.

A scale 120 is mounted upon the beam 80 and a pointer 121 is mounted upon a gear wheel 123, which latter is mounted for rotation upon a bearing 124, also secured upon the beam 80. The gear wheel 123 is rotated at a reduced speed by means of a smaller gear wheel 125, secured upon the shaft 96, as shown in dotted lines Fig. 3. The scale 120 is graduated proportionally to the rate of flow, and the position of the pointer 121, relatively to the scale, will show a reading which is a measurement of the rate of fluid flow through the conduit 119.

The pointer 121 is arranged to engage the beam 80, which latter forms a stop for the pointer adjacent to the zero position upon the scale when there is no flow through the conduit, thereby insuring the stopping of the sprocket wheel 95 in a position for supporting the chain in a vertical position adjacent to the pivot axis 85, with the sprocket wheel 95 in engagement with the end of the chain, and forming a support for the latter.

The operation of the meter shown in Fig. 3 is similar to the operation of the meter shown in Fig. 1, except that the chain 88 is employed as the means for applying the uniform load to the second lever arm 82.

When there is fluid flowing through the conduit 119 the chain 88 will be extended upon the arm 82 for loading the latter as a cantilever arm, with a uniform load forming a moment about the axis 85 which is proportional to the square of the length of the uniform load and equal to the moment of the concentrated load applied to the first arm 81 by the responsive device 108, and the pointer 121 will give a reading upon the scale which will indicate the rate of flow of fluid through the conduit 119.

The meter illustrated in Fig. 4 embodies a lever system having lever arms mounted for pivotal movement upon separate supports, or axes, and includes means adapted for adjustably coupling the arms for varying the ratio of the arms.

The lever system shown in Fig. 4 includes a beam 130 having stud shafts 131 provided with knife edges pivoted upon a fixed support 132 and forming a pivot axis 133 for the beam 130. The arm 135 of the beam 130 forms the first arm of the lever system and is adapted to be loaded with a concentrated load applied by a rod 136.

A conduit 138 is connected with a primary device 139, which produces a differential pressure which acts upon a pressure responsive device 140, which in turn acts upon the rod 136 pivotally connected with the first arm 135. A force applied through the rod 136 loads the first arm 135 with a concentrated load forming a moment which varies as the square of the rate of flow of fluid through the conduit 138.

A member, or arm 142, of the beam 130, is provided with a sleeve 143 which is slidably mounted upon the member 142. The sleeve 143 has stud shafts 144 provided with knife edges which form means for pivotally connecting a link 145. Said link has its opposite end pivotally connected with stud shafts 146 provided with knife edges and secured upon a sleeve 147, similar to the sleeve 143. Said sleeve 147 is slidably mounted upon a member, or arm 148, pivotally mounted upon a support 149. Said arm 148 is secured upon a head or block 150, which in turn is secured upon a bridge plate 152, having knife which are mounted upon the supports 149 which from a pivot axis 153.

An arm 155 forms the second arm of the lever system. Said arm 155 is arranged in an inclined position with its lower end secured in said block 150. Said arm 155 is constructed for receiving a uniform load having a length from said axis 153 which will form a moment proportional to the square of the length of the uniform load. Said uniform load upon the arm 155 tends to balance the lever system against the moment of the first arm 135, which is proportional to the square of the rate of flow through the conduit, and the length of the uniform load upon the second arm 155 is a direct measurement of the rate of flow through the conduit 138.

By adjusting the sleeves 143 and 147 upon the members, or arms 142 and 148, the ratio of the lever arms 135 and 155 may be varied to obtain equilibrium of moment arms of said loads, with different maximum values of the load applied to the first arm 135.

The second arm 155 is in the form of a tube adapted to be loaded with a uniform load in the form of mercury 156 from a manometer, or container 158, which is connected by means of a flexible pipe 159 with said head or block 150, having a passage in communication with the bore of the second arm 155 at a point adjacent to the axis 153.

The manometer, or container 158, for the mercury 156, is in the form of a U-tube having said pipe 159 forming one leg thereof, and a glass tube 160 forming the opposite leg. The leg 160 is connected with a pipe 162 adapted for supplying air under pressure for forcing the mercury through the pipe 159 into the bore of the arm 155. The air is supplied from a tank 163 through a pipe 164 to a valve 165. Said valve 165, as shown in Figs. 5 and 6, comprises a casing 166 mounted in a fixed position upon a support 167, and a shaft 168 mounted for rotation upon the axis of the casing. The shaft 168 is secured upon the bridge plate 152 and is rotatable by the movements of the second arm 155. Said shaft 168 is provided with a chamber 169, adapted for controlling communication from the air supply pipe 164 to the pipe 162, and also from the pipe 162 to the atmosphere through an exhaust aperture 170 formed in the casing 166.

The operation of the meter shown in Fig. 4 is as follows: When the lever system is in a balanced position the valve 165 is closed, as shown in Fig. 6, for retaining the uniform load upon the second arm 155. When the flow through the conduit 138 increases, the concentrated load acting through the rod 136 increases and elevates the free end of the second arm 155, thereby rotating the shaft, or valve stem 168, for admitting air under pressure from the pipe 164 to the pipe 162, which forces the mercury from the leg 160 through the pipe 159 to the bore of the arm 155, and restores the lever system to equilibrium.

When the flow through the conduit decreases, the concentrated load acting upon the first arm 135 will be reduced, and the free end of the arm 155 will move downwardly and operate the valve stem 168 to close the air supply pipe 164 and open communication between the pipe 162 and the aperture 170, leading to the atmosphere, thereby reducing the air pressure upon the mercury in the tube 160, and allowing the mercury to flow from the arm 155, into the tube 160, and again restoring the lever system to equilibrium, thus establishing a length of the uniform load upon the arm 155 which will be a direct measurement of the rate of flow through the conduit. A scale 175 is mounted adjacent to the leg 160, of the U-tube, and is adapted for indicating the rate of flow of fluid through the conduit.

By adjusting the link 145 to various positions relatively to the pivot axes 133 and 153, of the lever system, the meter may be adjusted for different maximum differential pressures, for obtaining equilibrium of moment of the loads upon the arms 135 and 155, with different maximum values of the concentrated load upon the arm 135.

The means for operating the meter by air under pressure, as above described, is of great advantage where electricity cannot be employed in certain buildings due to fire hazards.

The principle upon which my novel meter operates is as follows: The concentrated load upon the first lever arm has a magnitude proportional to the differential pressure and proportional to the square of the rate of flow through the conduit. The concentrated load acts at a fixed distance from the pivot axis of the first arm and produces a moment proportional to the square of the rate of flow.

The uniform load upon the second lever arm is extended until it balances the concentrated load upon the first arm. The moment of said uniform load is proportional to the square of the length of said uniform load.

When the moment of the second arm is balanced by a moment of the first arm, which latter is proportional to the square of the rate of flow, the result obtained is that the first power of the length of the uniform load is a measure of the first power of the rate of flow, and the scale indicating the length of the uniform load will give a measurement of the rate of flow through the conduit.

Various changes in the construction and arrangement of the parts may be made without departing from my invention.

I claim:

1. A meter for measuring the flow of fluid in a conduit comprising a balanced lever having cantilever arms, means for loading a first arm of said lever with a concentrated load having a constant moment arm, a primary metering device for producing a differential pressure proportional to the square of the rate of flow through the conduit, a pressure responsive device responsive to said differential pressure cooperating with said first mentioned means and arranged for varying said concentrated load to the response of said differential pressure, means for loading a second arm of said lever with a uniform load having a length measured from the origin of the second arm which will form a moment proportional to the square of the length of said uniform load, a head securing said arms together at their origin, a support forming a pivot axis for said head with said arms extending in different directions from said axis, said head having an axial passage extending transversely to the length of said second arm through which passage said uniform load is adapted to be moved to and from said second arm directly at said pivot axis, and means actuated by the unbalancing of said arms for varying said uniform load upon the second arm for maintaining equilibrium of moments of the loads upon said arms and establishing a length of said uniform load which is a measurement of the rate of flow.

2. A meter for measuring the flow of fluid in a conduit comprising a lever having cantilever arms, a support forming a pivot axis for said lever, means for loading one of said arms with a concentrated load having a moment about said axis proportional to the square of the rate of flow, means for loading a second arm with a uniform load forming a moment about said axis proportional to the square of the length of said uniform load, means for varying the length of said load upon the second arm for balancing said moments and establishing a length of said uniform load which is proportional to the rate of flow, and means for adjustably securing said arms together adjacent to said axis adapted for adjusting the radial positions of said arms relatively to each other for varying the ratio of said arms.

3. A meter for measuring the flow of fluid in a conduit comprising a lever having cantilever arms, a support forming a pivot axis for said lever, means for loading one of said arms with a concentrated load having a moment about said axis proportional to the square of the rate of flow, means for loading the second one of said arms with a uniform load, means for varying the length of said uniform load upon the second arm for balancing said lever, heads upon which the adjacent ends of the respective arms are secured, a bridge plate having a knife edge mounted upon said support, means securing one of said heads to said plate, means mounting said heads together for rotation about said axis, and locking means upon said heads adapted for securing the heads together with the arms in adjusted radial positions relatively to each other for varying the ratio of said arms.

4. A meter for measuring the flow of fluid in a conduit comprising balanced cantilever arms, means for loading a first one of said arms with a concentrated load having a moment proportional to the square of the rate of flow, means upon a second one of said arms forming a guide extending parallel with the length of said second arm, said guide extending from the origin of said second arm to the free end of the latter, said second arm having a lateral passage formed therein and communicating with said guide directly at the origin of the second arm, and means for applying a uniform load upon said guide through said passage for forming a moment of the second arm which will balance the moment of the first arm and the length of said uniform load will be directly proportional to the rate of flow.

5. A meter for measuring the flow of fluid in a conduit comprising balanced cantilever arms, means for loading a first one of said arms with a concentrated load having a moment proportional to the square of the rate of flow, means upon a second one of said arms forming a guide extending parallel with the length of the second arm, said guide extending from the origin of said second arm toward the free end of the latter, said second arm having a passage located adjacent to the origin thereof and forming a communication with said guide, said passage extending transversely to the length of said second arm, and means for applying a load through said passage and extending the last mentioned load upon said guide to form a uniform load for forming a moment of the second arm which will balance the moment of the first arm and the length of the uniform load will be directly proportional to the rate of flow.

6. A meter for measuring the flow of fluid in a conduit comprising balanced cantilever arms, means for loading a first one of said arms with a concentrated load having a moment proportional to the square of the rate of flow, a second one of said arms having an axial bore extending throughout its length, means mounting said second arm in a position inclined upwardly from its origin, a container adapted for containing liquid, means mounting the container independently of said arms, a flexible connection forming a communication between the container and said bore, means adapted for forcing the liquid from the container into said bore for loading the second arm with a uniform load forming a moment about the origin of the second arm proportional to the square of the length of said uniform load, and control means actuated by the unbalancing of said arms adapted for actuating said means for forcing the liquid into said bore for varying the amount of liquid within said bore for maintaining equilibrium of the moments of the loads upon said arms and establishing a length of said uniform load which is a measurement of the rate of flow.

7. A meter for measuring the flow of fluid in a conduit comprising a lever having lever arms, means forming a pivot axis about which the lever is adapted to be balanced, means for loading a first one of said arms of said lever with a concentrated load having a moment about said axis proportional to the square of the rate of flow, a second arm of said lever having an axial bore, means mounting said second arm in a position inclined upwardly from its origin, a plunger mounted in a fixed position, a cylinder mounted for movement upon the plunger, a liquid contained within the cylinder, a flexible pipe arranged for conducting the liquid to and from said bore, actuating means arranged for moving the cylinder relatively to the plunger for moving the liquid into said bore for loading the second arm with a uniform load forming a moment about said axis proportional to the square of the length of the uniform load, control means actuated by the unbalancing of said arms adapted for controlling said actuating means for varying the amount of liquid in said bore for maintaining equilibrium of said arms, a scale graduated proportionally to the rate of flow, a pointer, and means mounting the pointer and scale for relative movements corresponding to the relative movements of the plunger and the cylinder for indicating the rate of flow.

8. A meter for measuring the flow of fluid in a conduit comprising a lever having arms, means forming a pivot axis about which said lever is adapted to be balanced, means for loading a first arm of said lever with a concentrated load having a moment about said axis proportional to the square of the rate of flow, a second arm of said lever having an axial bore, means mounting said second arm in a position inclined upwardly from its origin, a cylinder, mercury contained within the cylinder, a plunger, means mounting the plunger in a fixed position, a flexible pipe connection between the cylinder and said bore, an electric circuit, a reversing motor included in said circuit and arranged for moving the cylinder relatively to the plunger for transferring the mercury to and from said bore for loading the second arm with a uniform load forming a moment about said axis proportional to the square of the length of said uniform load, and a switch included in said circuit and actuated by the unbalancing of said arms for operating the motor in a direction for maintaining equilibrium of the moments of the loads upon said arms and establishing a length of said uniform load which is a measurement of the rate of flow.

9. A meter for measuring the flow of fluid in a conduit comprising a balanced lever system having cantilever arms, means for loading a first arm of said system with a concentrated load having a moment about the origin of the first arm proportional to the square of the rate of flow, a second arm of said system having an axial bore extending from the origin of said second arm to the free end of the latter, a stationary container adapted for containing a liquid, a flexible connection forming a communication between the container and the end of said bore located adjacent to the origin of said second arm, a source of air pressure supply, a connection between said source and said container adapted for forcing the liquid from the container into said bore for loading the second arm with a uniform load forming a moment proportional to the square of the length of said uniform load, means mounting the second arm in an inclined position whereby the liquid will tend to flow toward the container when the air pressure is reduced, and control means actuated by the unbalancing of the system adapted for controlling the air under pressure acting upon the liquid in the container for varying the amount of liquid within said bore for maintaining equilibrium of the moments of the loads upon said arms and establishing a length of said uniform load which is a measurement of the rate of flow.

10. A meter for measuring the flow of fluid in a conduit comprising a balanced lever having cantilever arms, means for loading a first arm of said lever with a concentrated load having a moment about the origin of the first arm proportional to the square of the rate of flow, a second arm of said lever forming a guide extending parallel with the length thereof, weights mounted for movement upon said guide and adapted to form a uniform load having a length measured from the origin of the second arm which will form a moment proportional to the square of the length of the uniform load and balance the moment of the first arm, and means actuated by the unbalancing of said arms and adapted for moving said weights upon said guide for varying the length of the uniform load upon said guide for maintaining equilibrium of moments of the loads upon said arms and establishing a length of said uniform load which is a measurement of the rate of flow.

11. A meter for measuring the flow of fluid in a conduit comprising a lever having lever arms, means forming a pivot axis about which the lever is adapted to be balanced, means for loading a first arm of said lever with a concentrated load having a moment about said axis proportional to the square of flow, means upon a second arm of said lever forming a guide extending parallel with the length thereof, a series of weights connected in chain formation, mechanism located adjacent to said axis adapted for normally supporting said weights free of said guide, means for operating said mechanism for extending said weights upon the guide to form a uniform load having a length measured from said axis which will form a moment of the second arm proportional to the square of the length of the uniform load and balance the moment of the first arm, and control means actuated by the unbalancing of said lever and adapted for controlling said means for operating said mechanism for varying the length of the uniform load upon said guide for maintaining equilibrium of the moments of the loads upon said arms and establishing a length of said uniform load which is a measurement of the rate of flow.

12. A meter of the character described comprising a balanced system of levers having cantilever arms, means for applying a concentrated load at a fixed point upon one of the arms of said system forming a moment proportional to a force to be measured, means for applying a uniform load to a second arm of said system, means for varying the length of said uniform load from the origin of the second arm to a length upon the latter arm which is proportional to the square root of said concentrated load when said system is in balance, said system having a link associated with said arms and arranged for opposing the action of said loads upon the respective arms, means mounting said link for adjustment relatively to the origins of said arms for varying the ratio of the action of said loads for obtaining equilibrium of moments for different maximum values of said concentrated load, and means for measuring the length of said uniform load.

13. A meter for measuring the flow of fluid in a conduit comprising a system of levers having lever arms, supports forming separate pivot axes for said levers, means for loading one arm of a lever of the system with a concentrated load having a moment proportional to the square of the rate of flow, means for loading one arm of another of the levers of said system as a cantilever arm with a uniform load, said levers including member arms respectively, said system including a link connecting said member arms, means slidably mounting the link upon said member arms for adjustably coupling said levers for varying the ratio of the member arms for obtaining equilibrium of moments with different maximum values of said concentrated load, means for varying the length of said uniform load upon the cantilever arm for balancing said moments and establishing a length of said uniform load which is proportional to the rate of flow, and means for measuring the length of said uniform load.

EMORY FRANK STOVER.